United States Patent [19]

Seidel et al.

[11] Patent Number: 4,828,500

[45] Date of Patent: May 9, 1989

[54] APPARATUS AND METHOD FOR MOTION TEACHING

[75] Inventors: Gary E. Seidel, Golden; Robert A. Newman, III, Denver; Robert M. Newman, Denver; Henry Henschen, Denver, all of Colo.

[73] Assignee: Accelerated Sports Cybernetics Development Partnership, Denver, Colo.

[21] Appl. No.: 31,896

[22] Filed: Mar. 30, 1987

[51] Int. Cl.$^4$ .............................................. A63B 69/00
[52] U.S. Cl. ...................................... 434/247; 358/22
[58] Field of Search ................. 434/247; 358/22, 107, 358/183

[56] References Cited

U.S. PATENT DOCUMENTS

| | | | |
|---|---|---|---|
| 3,408,750 | 11/1968 | McCollough et al. | 434/252 |
| 4,015,344 | 4/1977 | Michaels et al. | 434/257 |
| 4,137,566 | 1/1979 | Haas et al. | 364/410 |
| 4,163,941 | 8/1979 | Linn, Jr. | 324/178 |
| 4,337,049 | 6/1982 | Connelly | 434/247 |
| 4,422,720 | 12/1983 | Sheiman et al. | 350/138 |
| 4,521,196 | 6/1985 | Briard et al. | 434/43 |
| 4,602,286 | 7/1986 | Keller et al. | 358/183 |
| 4,675,737 | 6/1987 | Fujino et al. | 358/22 |
| 4,713,695 | 12/1987 | Macheboeuf | 358/22 |

Primary Examiner—Leo P. Picard
Attorney, Agent, or Firm—Sheridan, Ross & McIntosh

[57] ABSTRACT

An improved apparatus and method for motion teaching by comparison of two recorded motion sequences is provided. Display of the motion sequences is synchronized by reference to a point, common to both sequences. Additionally, the motion sequences are compared by overlaying the displayed images in an optical fashion with an optical beam splitter.

23 Claims, 2 Drawing Sheets

APPARATUS AND METHOD FOR MOTION TEACHING

FIELD OF THE INVENTION

This invention relates to systems for teaching of motion sequences and, more particularly, to an apparatus and method for teaching motion sequences by a synchronized comparison between two motion sequences in which the two motions are visually overlaid in a mechanical fashion.

BACKGROUND OF THE INVENTION

Instruction of individuals in athletic endeavors, such as golfing, bowling, and tennis strokes, for improved performance in those sports is accomplished by numerous methods. Verbal instruction to a student is common, and demonstration of a particular motion sequence by one skilled in the activity is also frequently used. More sophisticated methods and apparatus for teaching motion sequences in various activities are also known.

U.S. Pat. No. 4,015,344 to Michaels et al. discloses a method and apparatus for teaching physical skills using a video tape of an instructor performing in front of a mirror which shows the instructor's back and the reflected image of the instructor's front. The tape of the instructor is shown to a pupil who simultaneously views the tape and his own image in a mirror situated next to the protection screen.

Connelly, U.S. Pat. No. 4,337,049 describes a method for automated training of manual skills in which a student's performance parameters, i.e. position, velocity and acceleration of body parts and equipment, are monitored and compared with ideal values. The deviation between student and ideal values is determined and a training signal is provided when the deviation exceeds a pre-set limit.

Linn, U.S. Pat. No. 4,163,941, describes a method and apparatus for determining the velocity of the head of a golf club. This invention focuses on only one variable, velocity of the club, in a complicated motion sequence involving positioning of the club and body, rhythm of the swing, and coordination of various movements. As can be appreciated, the velocity of a golf club head is not always indicative of a successful swing. Therefore, it is desirable to provide instructive systems which are directed to multiple aspects of a motion sequence.

A system is disclosed in Haas, U.S. Pat. No. 4,137,566, for analyzing a student golfer's swing by sensing the position of light-emitting devices located at the joints of a student's body during the execution of a golf swing. This information is translated into a computer-generated representation of the student's swing for subsequent viewing by the student. While this system allows a student to see a representation of the entire motion sequence, it cannot accurately reflect many subtle movements of the motion because the representation is a stick figure.

Haas further discloses the concept of comparing a student's swing with either a prior swing of the student or with a model teaching motion by electrically generated side-by-side, overlay or other electrically generated display methods. A potential difficulty with such comparison, not addressed by Haas, is the synchronization of the two swings to allow for an accurate comparison.

McCollough, U.S. Pat. No. 3,408,750, describes a system for golf instruction which provides a master tape of an ideal golf form for viewing by a student and a camera to view a student's swing. A means for electrically overlaying the image of the student's swing with the model teaching motion is also provided. The superimposed images can be viewed by an instructor for comparison of the two motions to detect deviations from the teaching motion. McCollough further provides for recording of the electrically overlaid student and teaching motions for subsequent viewing by the student. McCollough does not recognize or address the problem of synchronizing the superimposed student and teaching motions.

The mechanical overlay of two identical images through a refractive medium to produce a stereoscopic effect is known. (See U.S. Pat. No. 4,422,720 to Sheiman.) However, no known references provide for the mechanical overlay of two distinct visual images for the purpose of motion teaching, as in the present invention.

In view of the foregoing, there is a need for a motion teaching system in which two different motion sequence images can be visually compared by optically overlaying in a mechanical fashion the images and which provides a means for synchronizing the two images.

SUMMARY OF THE INVENTION

Accordingly, it is one object of the invention to provide a motion teaching system in which a student can compare a first motion sequence with a second motion sequence by overlaying visual images of the two motions.

Another object of the invention is to provide a motion teaching system for overlaying a first motion with a second motion for viewing by a student by mechanical means, such as an optical beam splitter.

A further object of the invention is to provide a motion teaching system which overlays a first motion with a second motion and provides a means for synchronizing the projection of the two associated images for more accurate and instructive comparison.

Additional advantages of the present invention will become readily apparent from the following discussion when taken in conjunction with the accompanying drawings.

In accordance with the present invention, an improved method and apparatus for teaching motion sequences is disclosed, preferably comprising control means, sensing means, camera means, first and second projection means, first and second videotape recorders, communication means, processing means, and optical overlay means. A user instructs processing means and communication means to have first and second videotape recorders record first and second motion sequences which are performed by the user. Alternatively, a prerecorded second motion sequence is provided to the second videotape recorder. Sensing means are employed to sense a common reference point during each motion sequence and transmits a corresponding audio signal to be recorded on the videotape on which the associated motion sequence is recorded. The processing means through the communication means determines the frame position corresponding to each recorded audio tone. Synchronized display of the first and second motion sequences recorded on the separate tapes is achieved by the processing means which instructs the communication means to position each tape for replay according to the previously identified frame location.

The communication means is then instructed to initiate simultaneous replay of the motion sequences. The two sequences are displayed on first and second projection means on either side of an optical overlay means. In this manner, two motion sequences can be compared for deviations between the sequences.

DETAILED DESCRIPTION OF THE INVENTION

Figure 1:
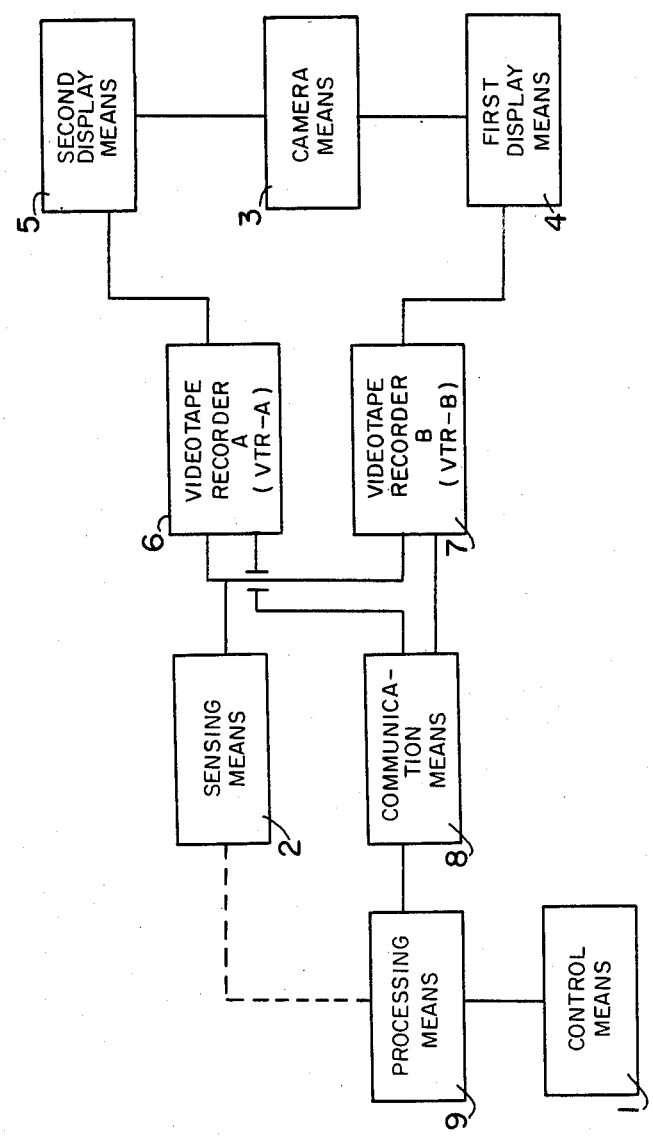
FIG. 1 is a block diagram showing the components of the preferred embodiment of the present invention.

In accordance with the preferred embodiment, FIG. 1 shows a block diagram of the apparatus consisting of control means 1, sensing means 2, camera means 3, first projection means 4, second projection means 5, videotape recorder A (VTR-A) 6, videotape recorder B (VTR-B) 7, communication means 8, processing means 9 and optical overlay means 10.

A user directs operation of various components of the apparatus through control means 1. To operate VTR-A 6 and VTR-B 7, a user instructs control means 1 to send an electric signal to processing means 9 which sends a signal to communication means 8, which in turn transmits the signal to either VTR-A 6 or VTR-B 7 to initiate the selected function of the videotape recorder, such as record or replay.

When control means 1 sends a signal to record to either VTR-A 6 or VTR-B 7, a signal from camera means 3 transmitting video information from its field of view will be accepted by the videotape recorder in operation.

Figure 2:
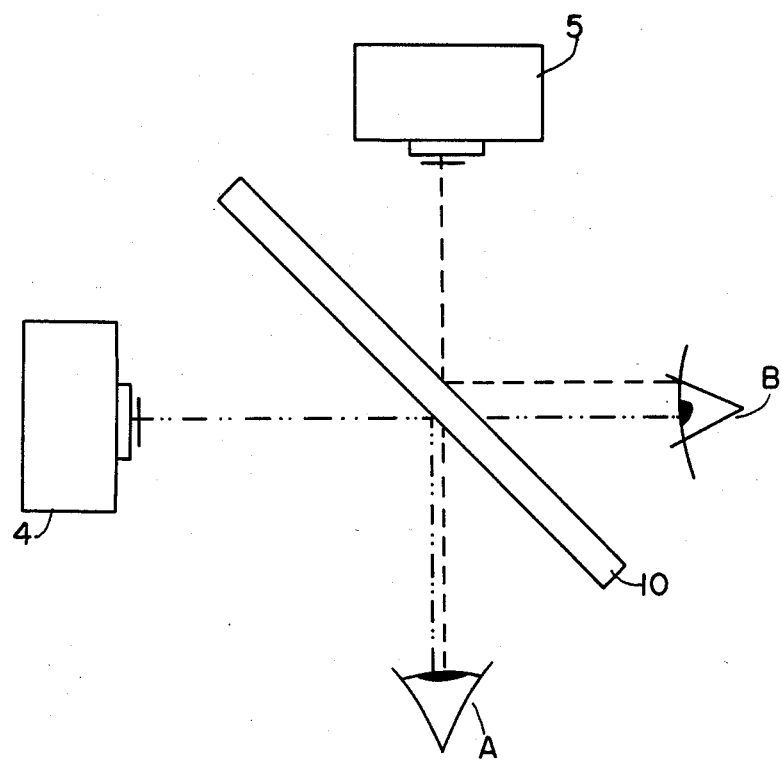
FIG. 2 is an illustration of the arrangement of the components utilized to optically overlay images in the preferred embodiment of the present invention.

Transmission of an instruction signal to initiate the display of a videotaped sequence is sent by control means 1, which in turn causes signal communication between processing means 9, communication means 8 and VTR-A 6 or VTR-B 7. As replay of the sequence on VTR-A 6 or VTR-B 7 begins, the videotape recorder in use sends a video signal to the corresponding projection means 4 or 5. This signal is displayed as a visual image on projection means 4 or 5, and in turn on optical overlay means 10 which is positioned within the field of display of projection means 4 and 5 as shown in FIG. 2. As can be appreciated, control means 1 can also instruct simultaneous replay of videotapes in both VTR-A 6 and VTR-B 7 by signals sent to the videotape recorders through processing means 9 and communication means 8. When simultaneous replay is initiated, video signals are transmitted by VTR-A 6 and VTR-B 7 to projection means 4 and 5, and the corresponding visual images displayed on projection means 4 and 5 are optically overlaid on overlay means 10.

In order to achieve synchronized replay of recorded motion sequences, reference points on the associated videotapes are utilized. Specifically, during the recording of a motion sequence, sensing means 2 will receive information corresponding with a specific reference point in the motion sequence. This information is transmitted as an audio tone to VTR-A 6 or VTR-B 7 and will be recorded on a first audio track at a corresponding location on the videotape which is recording the associated video image of the motion sequence. Alternatively, sensing means 2 may send a detection signal to processing means 9 as an electric signal indicating the reference point. Processing means 9 then sends an electric signal to communication means 8 requesting the current frame position of the videotape in the videotape recorder which is in use. Communication means 8 continuously receives an audio signal from a second audio channel on the videotape with frame position information which is transmitted to processing means 9 when requested.

In an application of the preferred embodiment to golf, sensing means 2 can comprise a Mitsubishi Model 150 Golf Trainer to detect the motion of a golf club as it contacts a golf ball as the reference point in a golf swing motion sequence. The Mitsubishi unit operates on the principle that the metal in the club or in an added metal strip interferes with the frequency of a current flowing through coils located in a matlike apparatus positioned below the golf ball.

As is apparent from the above discussion, communication means 8 communicates signals between processing means 9 and the videotape recorders 6 and 7. In addition to transmitting videotape frame information from second audio channels to processing means 9 and sending record and playback instructions to videotape recorders 6 and 7, communication means 8 sends videotape positioning instructions, rewind and fast forward, to videotape recorders 6 and 7, in accordance with instructions received from processing means 9. Communication means 8 also receives audio signals from the first audio channel of videotapes indicating a reference point and then sends an electric signal corresponding to the audio signal to processing means 10.

As can be appreciated by those skilled in the art, the communication means 8 can be an interactive video control board for controlling communication between a computer and a videotape recorder. BCD Associates of Oklahoma City, Okla., produce an interactive video control board, Model VIPC, suitable as communication means 8. The processing means 9 in one embodiment of the invention comprises an Apparat personal computer.

In operation of the invention, a first videotaped motion sequence must be provided or generated for subsequent comparison with a second videotaped motion sequence. By way of example, the first sequence can be a previously recorded motion sequence, as provided on a videotape that is loaded in VTR-A 6. Alternatively, the user can generate a first motion sequence by recording one or more sequences and selecting one for subsequent comparison against a second motion sequence. To record a first motion sequence, the user instructs control means 1 to initiate recording on VTR-A 6 and moves into the field of view of camera means 3 to begin performing a series of motion sequences. For example, a golf swing, a bowling motion, and a tennis swing could be performed in accordance with the invention. In response to an instruction signal to begin recording sent by control means 1 to processing means 9, and corresponding communications with communication means 8, VTR-A 6 starts receiving and recording video information from camera means 3.

As each sequence is performed and recorded by VTR-A 6, sensing means 2 detects a reference point in the sequence by monitoring some physical parameter of the sequence as noted hereinabove. The reference point information received by sensing means 2 is translated into an audio tone and transmitted to VTR-A 6 and recorded on a first audio channel at a position on the videotape corresponding to the visual image of the reference point.

Different motion sequences will, of course, have different reference points. For example, in a golf swing, a convenient reference point is the instant when the club head strikes the ball. In this application, the point of impact between the head of a golf club and a golf ball can be sensed by an audio sensor sensing the sound created by the impact, or alternatively, the sensing means can detect a beam of light being broken by the club at some point during the swing. A convenient reference point in a bowling motion is the point in time when the bowling ball traverses the plane between the approach run and the lane.

After recording is initiated, VTR-A 6 will continue recording until instructed by communication means 8 to stop as will be further explained. Specifically, when processing means 9 receives a signal from control means 1 to initiate recording, in addition to transmitting a record instruction signal to communication means 8, processing means 9 instructs communication means 8 to return a signal to the processing means 9 when the videotape reaches a frame number corresponding with the passage of a predetermined segment of time. When that frame is reached, the communication means 8 issues a tone of fixed frequency and duration to processing means 9 signifying the end of a recording segment. Processing means 9 then sends a signal to communication means 8 to end recording on VTR-A 6. A signal is then transmitted by communication means 8 to VTR-A 6 to stop recording.

After one or more motion sequences are recorded on a videotape in VTR-A 6 in the manner described above, the user must select a first motion sequence for subsequent comparison with a second videotaped motion sequence. To view the motion sequences recorded on the tape in VTR-A 6, the user enters a command into control means 1 to replay the recorded sequences so that one can be designated for subsequent comparison. This command is sent to processing means 9 which instructs communication means 8 to rewind the tape in VTR-A 6 to the beginning of the associated recorded segments and to begin display of the sequences on projection means 4 or 5 from that point.

As the tape is displayed visually, communication means 8 is monitoring the first audio channel on which tones corresponding to reference points for each sequence are recorded. As each tone is played, communication means 8 sends a signal to processing means 9. Upon receiving this information, processing means 9 queries communication means 8 for the frame position of the videotape at the reference point. Communication means 8 reads the frame position from the frame code on the second audio channel which identifies each frame by hours, minutes, seconds and frames from the beginning of the tape. As processing means 9 receives the frame position information from communication means 8, a memory file is created by processing means 9 containing frame positions corresponding to reference points for each motion sequence.

As the recorded sequences are displayed and a file containing frame positions of reference points is created, the user views the sequences on projection means 5. When a sequence is displayed which the user wishes to use for subsequent comparison, the user enters a command on control means 1 designating the sequence. Control means 1 then sends a signal to processing means 9 indicating that the designated sequence is being viewed. The processing means 9 then queries the communication means 8 for the current frame position of the videotape. The communication means 8 reads the position from the second audio track and informs the processing means 9 of the frame position which corresponds with a specific point in the designated sequence. The processing means 9 then compares the designated frame position against the frame positions in the memory file containing frame positions of reference points and selects the reference point closest to the designated frame position. This reference point is then identified as the reference point for the designated sequence.

A alternative method of creating a memory file containing the frame location of each reference point can be conducted while motion sequences are being recorded. In this embodiment, as discussed above, as the sensing means 2 senses information about a reference point, the information is transmitted directly to the processing means 9. Upon receipt of the information, processing means 9 queries communication means 8 for the current frame position located on the second audio channel. As frame position information is received from communication means 8, processing means 9 creates a memory file containing frame positions for reference points of a series of sequences.

The user has now selected and designated a first motion sequence on the tape in VTR-A 6 for comparison with one or more second motion sequences. The user now enters a command on control means 1 to record a series of second motion sequences on a tape in VTR-B 7. The command to record is sent to processing means 9 which, in turn, sends a signal to communication means 8 to instruct VTR-B 7 to begin recording. VTR-B 7 then begins receiving video signals from camera means 3 and recording a visual image of the received signals. The user must move into the field of view of camera means 3 and be positioned in the same orientation with respect to camera means 3 as when the designated sequence on the tape in VTR-A 6 was recorded. The user then performs the same sequence one or more times while VTR-B 7 is recording. This recording segment is ended in the same manner as described above for the tape in VTR-A 6.

As the tape in VTR-B 7 is recording, sensing means 2 is receiving and transmitting reference point information to be recorded on the first audio channel, as described above for VTR-A 6. After recording is ended, the user must select a second motion sequence for comparison with the previously selected first motion sequence. To view the motion sequences recorded on the tape in VTR-B 7, the user enters a command into control means 1 to replay the recorded sequences. This command is sent to processing means 9 which instructs communication means 8 to rewind the tape in VTR-B 7 to the beginning of the associated recorded segments and to begin display of the sequences on projection means 4 or 5 from that point. As the tape in VTR-B 7 is replayed, a memory file containing reference point frame location information is created by processing means 9 in the manner described above for the tape in VTR-A 6. Alternatively, a memory file can be created during recording on the tape in VTR-B 7 in the manner described above.

As the tape is replayed, the user views the visual display of the recorded motion sequences an selects one for comparison by entering a command on control means 1 designating a displayed sequence in the same manner as described above for the tape in VTR-A 6. At this point, the user is able to compare the designated motion sequence on the tape in VTR-A 6 with the designated motion sequence on the tape in VTR-B 7 by synchronized display of the sequences. The user instructs control means 1 to compare the designated sequences. Control means 1 sends a signal to the processing means 9 to initiate the comparison function.

In many instances, the reference point will be in the middle of a motion sequence, for example, a golf club head striking a golf ball, and therefore, the videotape must start prior to the reference point to display the entire motion sequence. The processing means 9 can be pre-programmed to account for the need to begin display of a sequence prior to the reference point. For a golf swing, the processing means locates the reference point, i.e., impact between the club head and ball, and causes the videotape to rewind a sufficient amount to a "mark point" that permits display of the tape to begin before initiation of the golf swing.

When processing means 9 receives the signal to compare motion sequences, the frame position for the reference point of the designated sequence on the tape in VTR-A 6 is recalled and the mark point for that sequence determined. The processing means 9, sends a signal to communication means 8, to instruct VTR-A 6 to move forward or rewind to the frame position corresponding to the mark point of the designated motion sequence. The processing means 9 also determines the frame position for the mark point of the designated motion sequence recorded on the tape in VTR-B 7, and signals communication means 8 to move the videotape in VTR-B 7 to the mark point of that motion sequence.

After both videotapes have been positioned at the respective mark points, synchronized display of the sequences is initiated by a signal from the processing means 9. This signal instructs the communication means 8 to begin replay of both videotapes from the mark points. In this manner, the sequences are synchronized and deviations between the motions can be observed. The motion sequence on the videotape in VTR-A 6 is displayed on projection means 5 and the motion sequence on the videotape in VTR-B 7 is displayed on projection means 4. By way of example, projection means 4 and 5 can be video monitors of a type which are well known to those skilled in the art.

The designated motion sequences from VTR-A 6 and VTR-B 7 are displayed in synchronization and compared with each other. At the conclusion of this display, the user can instruct the control means 1 to compare the same designated sequences a second time. Alternatively, the use can designate a new sequence on the tape in VTR-A 6 and/or the tape in VTR-B 7 for comparison. To make a new designation, the user enters a command on control means 1 to replay the recorded sequences on either the tape in VTR-A 6 or VTR-B 7. As described above, when the user views a desired sequence for comparison, that sequence is designated as such through control means 1. In this manner, the user can selectively compare any sequence recorded on the tape in VTR-A 6 with any sequence on the tape in VTR-B 7.

As an alternative embodiment, processing means 9 can be programmed to compare one designated sequence on the tape in VTR-A 6 with multiple sequences on the tape in VTR-B 7. In operation, the user would designate a sequence on the tape in VTR-A 6 and instruct command means 1 to compare the motion sequences. This instruction is transmitted to processing means 9 which signals communication means 8 to position the tape in VTR-A 6 at the mark point of the designated sequence. Processing means 9 also signals communication means 8 to position the tape in VTR-B 7 at the mark point of the first sequence to be compared. Processing means 9 then instructs communication means 8 to initiate replay of VTR-A 6 and VTR-B 7 for display of the sequences. At the conclusion of this display, the processing means 9 instructs the communication means 8 to rewind the tape in VTR-A 6 to the mark point of the designated sequence and to move the tape in VTR-B 7 to the mark point of the second motion sequence. These two sequences are then displayed in synchronization. This procedure is repeated for each sequence recorded on the tape in VTR-B 7.

The first motion sequence is displayed from projection means 5. The second motion sequence to be compared with the first is displayed from projection means 4. Projection means 4 is preferably positioned, as shown in FIG. 2, at a right angle to projection means 5. An optical overlay means 10 is placed at a 45° angle with respect to both projection means 4 and 5. By viewing the overlaid images, a viewer can detect deviations between two motion sequences.

For viewer A in FIG. 2 to see both sequences in the correct left hand/right hand orientation, the second motion sequence is reversed by projection means 4 because the projected image of the second motion sequence is subsequently reflected by optical overlay means 10. In this manner, viewer A sees the overlaid images in the original orientation. Viewer B, however, sees the directly transmitted image from projection means 4, which is in reverse orientation, overlaid with the reflected image from projection means 5. Therefore, viewer B sees the overlaid mirror images of the original sequences in reverse orientation. As will be appreciated by those skilled in the art and by way of example only, the orientation of a motion sequence projected by a projection means 4 or 5 can be reversed when a video monitor is employed by reversing the orientation of the yoke of the video monitor.

The optical overlay means 10 can be an apparatus which functions either by reflectance or refractance. An optical beam splitter is a reflectance apparatus capable of transmitting a projected image striking it at a 45° angle directly through the apparatus and also capable of reflecting another projected image, striking its other face at a 45° angle, at an angle of 90° from the angle of incidence. With reference to FIG. 2, viewer A will see an image displayed by projection means 5 which is transmitted directly through the optical beam splitter 10. The viewer would also see, overlaid with the image from projection means 5, the image displayed by projection means 4 which is reflected 90° from the angle of incidence.

In a refinement of the preferred embodiment, projection means 4 and 5 can comprise light filters through which the images are displayed. Each filter selectively absorbs a particular region in the visible light spectrum, giving the transmitted light a colored cast. Pairs of color filters are chosen for projection means 4 and 5 so that when the two distinct images displayed by projection means 4 and 5 are overlaid on the optical overlay means 10, any portions of the images which coincide will be colored by a combination of the light transmitted through both filters, while portions of the images which do not coincide will be colored by the light transmitted by one of the filters. Use of light filters in this manner will serve to further highlight the deviations between two motion sequences for instructive observation.

In a further refinement of the preferred embodiment, light filters are chosen so that the colors of light transmitted through the filters are complementary. In this manner, as two motion sequences are overlaid, the background and the portions of the images in the motion sequences which coincide will have a natural coloring. The portions of the images which are mismatched, however, will appear to be tinted one of the light filter colors. Table 1 provides examples of complementary color pairs for light filters suitable for use in the invention.

TABLE 1

| Pair No. | Color 1 | Wavelength (mu) | Color 2 | Wavelength (mu) |
|---|---|---|---|---|
| 1 | red | 656.2 | green-blue | 492.1 |
| 2 | orange | 607.7 | blue | 489.7 |
| 3 | golden yellow | 585.3 | blue | 485.4 |
| 4 | golden yellow | 573.9 | blue | 482.1 |
| 5 | yellow | 567.1 | indigo blue | 464.5 |
| 6 | yellow | 564.4 | indigo blue | 461.8 |
| 7 | green-yellow | 563.6 | violet | 433.0 to end |

In view of the foregoing, it should be appreciated that the present invention can be used to compare two motion sequences by optically overlaying the visual display of the sequences. The invention provides a simple mechanical method for overlaying the images without the need for additional electronic equipment. It should also be apparent that after an individual has developed a desired motion sequence in a given activity, that sequence can be recorded on a videotape and saved for future monitoring and/or instructive use.

The present invention also provides a means for synchronizing the display of two motion sequences for purposes of comparison. Two motion sequences can be precisely synchronized so that even small deviations in the motion sequences can be detected. By virtue of this feature of the invention, users are able to more easily identify and correct defects in their performance.

Based on the above detailed description, salient features of the present invention are readily apparent. In the disclosed invention motion sequences are recorded on separate videotapes. A sensing means is provided for detecting a reference point in each motion sequence as it is recorded and producing an audio tone that is recorded on the videotape. As the tapes are replayed, a communication means hears the audio tones and informs the processing means which queries the communication means for the corresponding frame locations. A file is created by the processing means containing the frame locations. Two motion sequences on the videotapes can be displayed in synchronization with respect to the reference points. The processing means instructs videotape recorders through communication means to locate the frame location on each videotape corresponding to the reference point and to rewind a predetermined distance from that point. The videotapes are then displayed in synchronization for comparison between the two.

The invention further provides for optically overlaying the displayed images by mechanical means. The images are preferably displayed at 90° with respect to each other. An optical overlay means is placed between the projection means at a 45° angle with regard to each projection means. As the images are displayed, they can be viewed by an observer who sees the images overlaid and in synchronization. Additionally, colored filters can be utilized with the projection means to highlight deviations between the two motion sequences.

While various embodiments of the present invention have been described in detail, it is apparent that modifications and adaptations of these embodiments will occur to those skilled in the art. However, it is to be expressly understood that such modifications and adaptations are within the scope of the present invention, as set forth in the following claims.

What is claimed is:

1. An apparatus for use in visually comparing first and second versions of a motion sequence, wherein at least one of said versions is recorded, comprising:
   (a) first display means for visually displaying said first version of said motion sequence;
   (b) second display means for visually displaying said second version of said motion sequence; and
   (c) optical overlay means optically associated with said first and second display means, for optically receiving said visual displays of said first and second versions of said motion sequence, and for optically overlaying said visual displays to permit identification of deviations between the first and second versions of said motion sequences.

2. An apparatus, as claimed in claim 1, wherein said optical overlay means is an optical beam splitter having first and second display surfaces and wherein said first display means comprises means for reversing the orientation of said first version of said motion sequence.

3. An apparatus as claimed in claim 2, wherein said visual display of said first version of said motion sequence is projected from said first display means onto said first display surface of said optical beam splitter at an angle of incidence of 45°, and wherein said visual display of said second version of said motion sequence is projected from said second display means onto said second display surface of said optical beam splitter at an angle of incidence of 45°, and wherein said first and second display means project said visual displays of said first and second versions of said motion sequence at 90° with respect to one another.

4. An apparatus, as claimed in claim 1, wherein said first display means comprises a first light filter of a first color through which said first version of said motion sequence is displayed, wherein said second display means comprises a second light filter of a second color through which said second version of said motion sequence is displayed, and wherein said deviations from coincidence of said optically overlaid visual displays of said first and second versions of said motion sequence are highlighted by said first and second colors.

5. An apparatus, as claimed in claim 1, further comprising synchronizing means for synchronizing said optically overlaid visual displays of said first and second versions of said motion sequence with respect to a substantially common point in said first and second versions of said motion sequence, wherein said first and second versions of said motion sequence are provided on separate first and second videotapes.

6. An apparatus, as claimed in claim 5, wherein said synchronizing means comprises;
   (a) referencing means for identifying a location on each of said first and second videotapes corresponding to said substantially common point in said first and second versions of said motion sequence; and (b) coordinating means for coordinating simultaneous display of said visual displays of said first and second versions of said motion sequence through the utilization of said identified locations.

7. An apparatus for use in visually comparing first and second versions of said motion sequences, comprising:
   (a) first display means for visually displaying said first version of said motion sequence;
   (b) second display means for visually displaying said second version of said motion sequence; and
   (c) synchronizing means for synchronizing said visual display means of said first and second versions of said motion sequence with respect to a substantially common point in said first and second versions of said motion sequence.

8. An apparatus as claimed in claim 7, wherein said first and second versions of said motion sequence are recorded on separate first and second videotapes and wherein said synchronizing means comprises:
   (a) referencing means for identifying a reference location on each of said first and second videotapes corresponding to said substantially common point in said first and second versions of said motion sequence; and
   (b) coordinating means for coordinating simultaneous display of said visual displays of said first and second versions of said motion sequence through the utilization of said identified reference locations.

9. An apparatus as claimed in claim 8, wherein said referencing means comprises:
   (a) sensing means for sensing said common point in said first and second versions of said motion sequence and transmitting first signals corresponding to said substantially common point; and
   (b) reading means for receiving said first signals and identifying said reference locations on said first and second videotapes corresponding to said substantially common point.

10. An apparatus, as claimed in claim 9, wherein said first signals transmitted by said sensing means are audio tones.

11. An apparatus as claim in claim 10, wherein said reading means comprises a personal computer having a voice board wherein said reading means receives said audio tones and generates second signals corresponding to said audio tones.

12. An apparatus as claimed in claim 11, wherein said reading means further comprises first and second interactive video boards, wherein said personal computer generates said second signals which are sent to said interactive video boards.

13. An apparatus as claimed in claim 12, wherein said reading means further comprises said first and second videotapes having second tracks containing frame location information, wherein said interactive video boards receive said second signals from said personal computer, wherein said second signals cause said interactive video control boards to read said second tracks for frame location information, and wherein said interactive video board send third signals to said personal computer identifying frame locations.

14. An apparatus as claimed in claim 13, wherein said coordination means comprises said personal computer and said interactive video boards, wherein said personal computer instructs said interactive video boards to cause said first and second display means to position said first and second videotapes at said reference locations on said first and second videotapes corresponding to said common point and said personal computer instructs said interactive video boards to initiate simultaneous display of said first and second versions of said motion sequence from said reference locations.

15. An apparatus as claimed in claim 9, wherein said reading means comprises said first and second videotapes having first tracks for receiving and recording said first signals and second tracks containing frame code information to identify frame locations on each videotape.

16. An apparatus as claimed in claim 15, wherein said reading means further comprises computing means for receiving second signals corresponding to said first signals and in response to receiving said second signals, for identifying a first and second frame location on each videotape corresponding to said first signals.

17. An apparatus as claimed in claim 16, wherein said reading means further comprises first and second interactive video boards for receiving said first signals as said first and second videotapes are separately replayed and sending said second signals to said computing means, for receiving frame location queries from said computing means and reading said second audio tracks for frame location information, and for sending third signals to said computing means identifying frame locations.

18. An apparatus as claimed in claim 17, wherein said coordinating means comprises said computing means and said interactive video boards, wherein said computing means instructs said interactive video boards to cause said first and second display means to position said first and second videotapes at said reference locations and said computing means instructs said interactive video boards to initiate simultaneous display of said first and second versions of said motion sequence from said reference locations.

19. A method for use in visually comparing first and second versions of a motion sequence, wherein at least one of said versions is recorded, comprising:
   (a) providing a first version of a motion sequence
   (b) providing a second version of a motion sequence;
   (c) identifying a common reference point in said first and second versions of said motion sequence;
   (d) initiating simultaneous, synchronized visual display of said first and second versions of said motion sequence from said common reference point.

20. A method as claimed in claim 19, wherein said first and second versions of said motion sequence are provided on separate first and second videotapes and wherein the step of identifying comprises:
   (a) sensing at least one common physical parameter in each of said first and second versions of said motion sequence as said sequences are recorded on said first and second videotapes; and
   (b) associating each of said sensed physical parameters with a frame position on said first and second videotapes.

21. A method as claimed in claim 20, wherein the stop of associating comprises:
   (a) generating a signal as each physical parameter in said first version of said motion sequence is sensed and as each physical parameter in said second version of said motion sequence is sensed;
   (b) monitoring the frame position of said videotapes;
   (c) receiving said signals; and
   (d) identifying and storing information relating to said frame position as each signal is received.

22. A method, as claimed in claim 21, wherein the step of initiating synchronized display comprises the step of positioning said first and second videotapes at locations corresponding to said identified frame positions and initiating display of said first and second versions of said motion sequence from said locations.

23. A method, as claimed in claim 19, further comprising the step of overlaying said visual displays of said first and second versions of said motion sequence by optical overlay means.

* * * * *